United States Patent
Emberling et al.

(10) Patent No.: US 6,885,375 B2
(45) Date of Patent: Apr. 26, 2005

(54) STALLING PIPELINES IN LARGE DESIGNS

(75) Inventors: Brian D. Emberling, San Mateo, CA (US); Ewa M. Kubalska, San Jose, CA (US); Steve Kurihara, Palo Alto, CA (US); Anthony S. Ramirez, Sunnyvale, CA (US); Andre J. Gaytan, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 218 days.

(21) Appl. No.: 10/095,308

(22) Filed: Mar. 11, 2002

(65) Prior Publication Data

US 2003/0169261 A1 Sep. 11, 2003

(51) Int. Cl.⁷ .................................................. G06T 1/20
(52) U.S. Cl. ....................... 345/506; 345/536; 345/520; 345/537
(58) Field of Search ................................ 345/503, 506, 345/536, 520, 537, 559

(56) References Cited

U.S. PATENT DOCUMENTS

| | | | |
|---|---|---|---|
| 5,067,069 A | | 11/1991 | Fite et al. |
| 5,706,415 A | * | 1/1998 | Kelley et al. ................ 345/426 |
| 6,038,658 A | * | 3/2000 | Chow .......................... 712/219 |
| 6,145,032 A | * | 11/2000 | Bannister et al. ............. 710/52 |
| 6,192,466 B1 | * | 2/2001 | Gschwind .................... 712/214 |
| 6,222,550 B1 | * | 4/2001 | Rosman et al. .............. 345/419 |
| 6,279,100 B1 | | 8/2001 | Tremblay et al. |
| 6,618,802 B1 | * | 9/2003 | Arnold et al. ............... 712/219 |
| 2002/0004859 A1 | * | 1/2002 | Stoney .......................... 710/7 |
| 2002/0069348 A1 | * | 6/2002 | Roth et al. ................... 712/219 |
| 2002/0120831 A1 | * | 8/2002 | Wong et al. ................. 712/219 |

* cited by examiner

Primary Examiner—Ulka J. Chauhan
(74) Attorney, Agent, or Firm—Meyertons Hood Kivlin Kowert & Goetzel, P.C.; Jeffrey C. Hood

(57) ABSTRACT

A method and a system for stalling large pipelined designs. A computational pipeline may comprise a first module and a second module coupled together. The first module may propagate one or more signals to the second module. A stall-signal may be asserted in order to stall the computational pipeline if the second module is not ready to receive the one or more signals from the first module. The one or more signals propagated from the first module and the asserted stall-signal may be buffered in a stall-buffer. The asserted stall-signal may be propagated to the first module in a next cycle. The first module may be stalled in response to the first module receiving the propagated asserted stall-signal. Next, the asserted stall-signal may be propagated up the computational pipeline.

24 Claims, 13 Drawing Sheets

STALLING PIPELINES IN LARGE DESIGNS

BACKGROUND OF THE INVENTION

1. Field of the Invention

This invention relates generally to the field of computer graphics and, more particularly, to stalling pipelines in large designs.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modern graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from converters is conveyed to a display device such as a computer monitor, LCD display, or projector.

Furthermore, in large pipelined designs, it is often necessary to stall an entire design and/or an entire module at once by using a single stall-signal. The stall-signal may fan-out to a plurality of logic elements, such as flip-flops and registers. If two modules in a pipeline contain a large number of logic elements, then the single stall-signal may not reach all the necessary logic elements at once, and timing problems may be created.

SUMMARY OF THE INVENTION

The problems set forth above may at least in part be solved in some embodiments by a system or method for stalling pipelines in large designs.

In one embodiment, a computational pipeline may comprise a first module and a second module coupled together. The first module may propagate one or more signals to the second module. The second module may execute some or all of its internal logic in response to receiving the one or more propagated signals from the first module. The method may include determining if the second module is ready to receive the one or more signals from the first module. The method may include asserting a stall-signal operable to stall the computational pipeline if the second module is not ready to receive the one or more signals from the first module.

The method may include propagating the one or more signals from the first module to the second module. The method may include buffering the one or more signals propagated from the first module in a stall-buffer in response to receiving the asserted stall-signal. The method may include buffering the asserted stall-signal in the stall-buffer in response to receiving the asserted stall-signal.

The method may include propagating the asserted stall-signal to the first module in a next cycle after buffering the asserted stall-signal. The next cycle may specify a next clock cycle or a function of the next clock cycle. The method may include stalling the first module in response to the first module receiving the propagated asserted stall-signal. In one embodiment, stalling may be operable to suspend the operation of the first module. In another embodiment, stalling may be operable to buffer outputs of the first module.

The method may include propagating the asserted stall-signal up the computational pipeline. The asserted stall-signal is operable to travel in a direction opposite to the flow of the computational pipeline, i.e., a direction opposite to the flow of the one or more signals.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
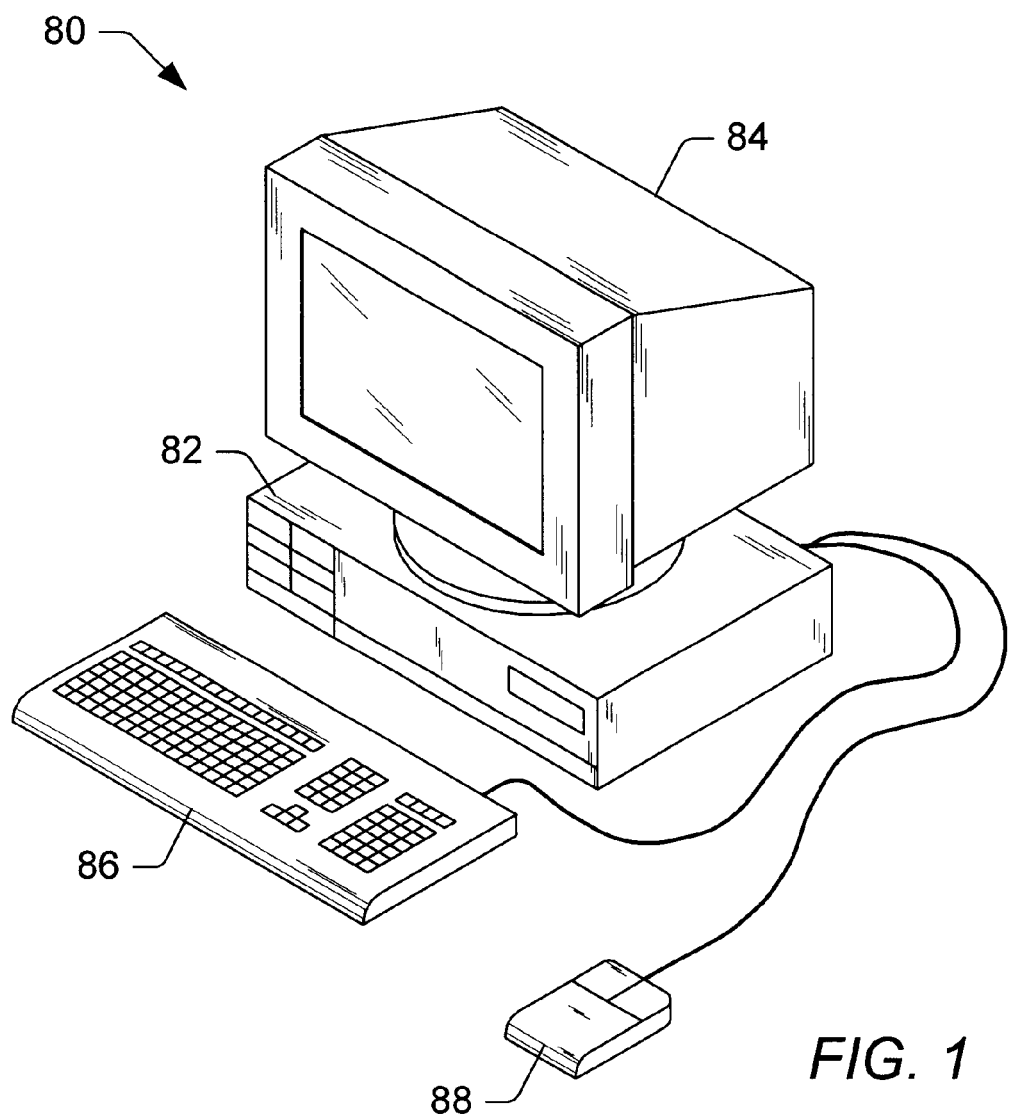
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Incorporation by Reference

U.S. Pat. No. 6,279,100 titled "Local Stall Control Method and Structure in a Microprocessor," filed Dec. 3, 1998, is hereby incorporated by reference as though fully and completely set forth herein.

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
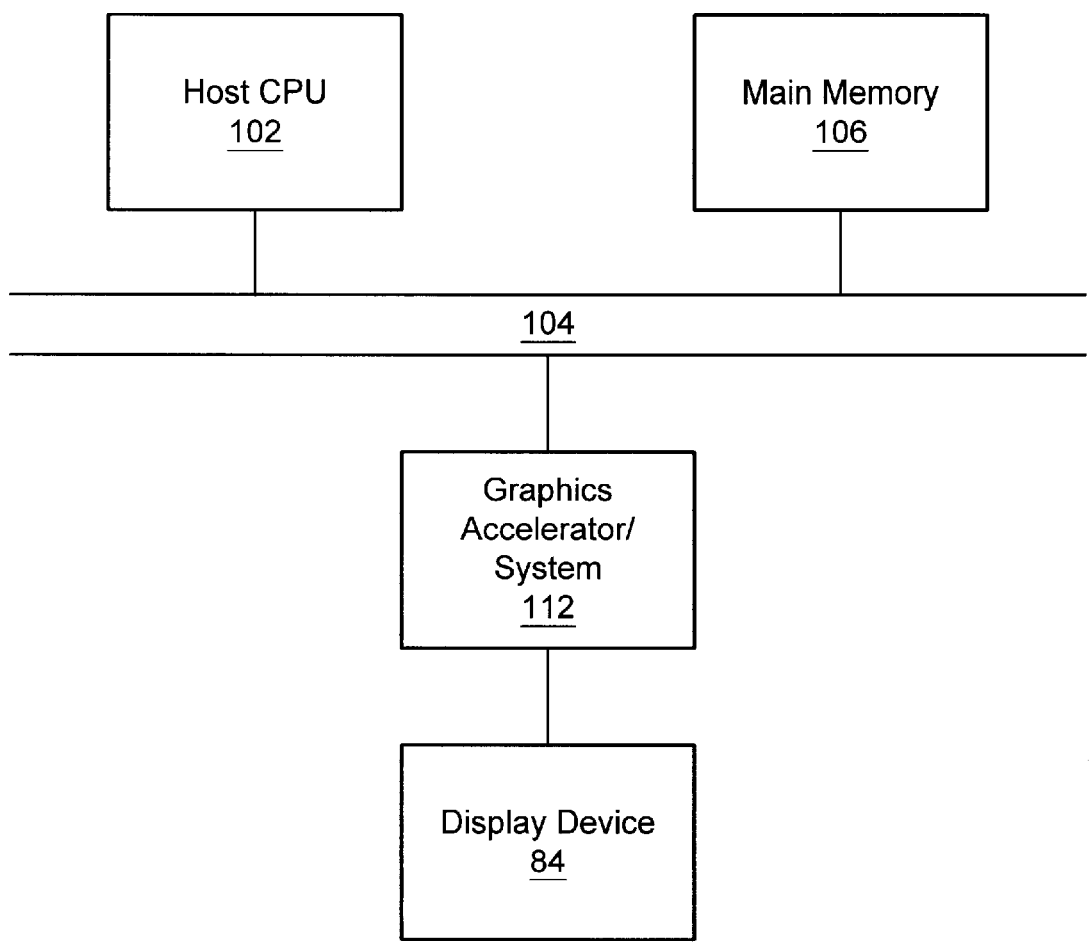
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
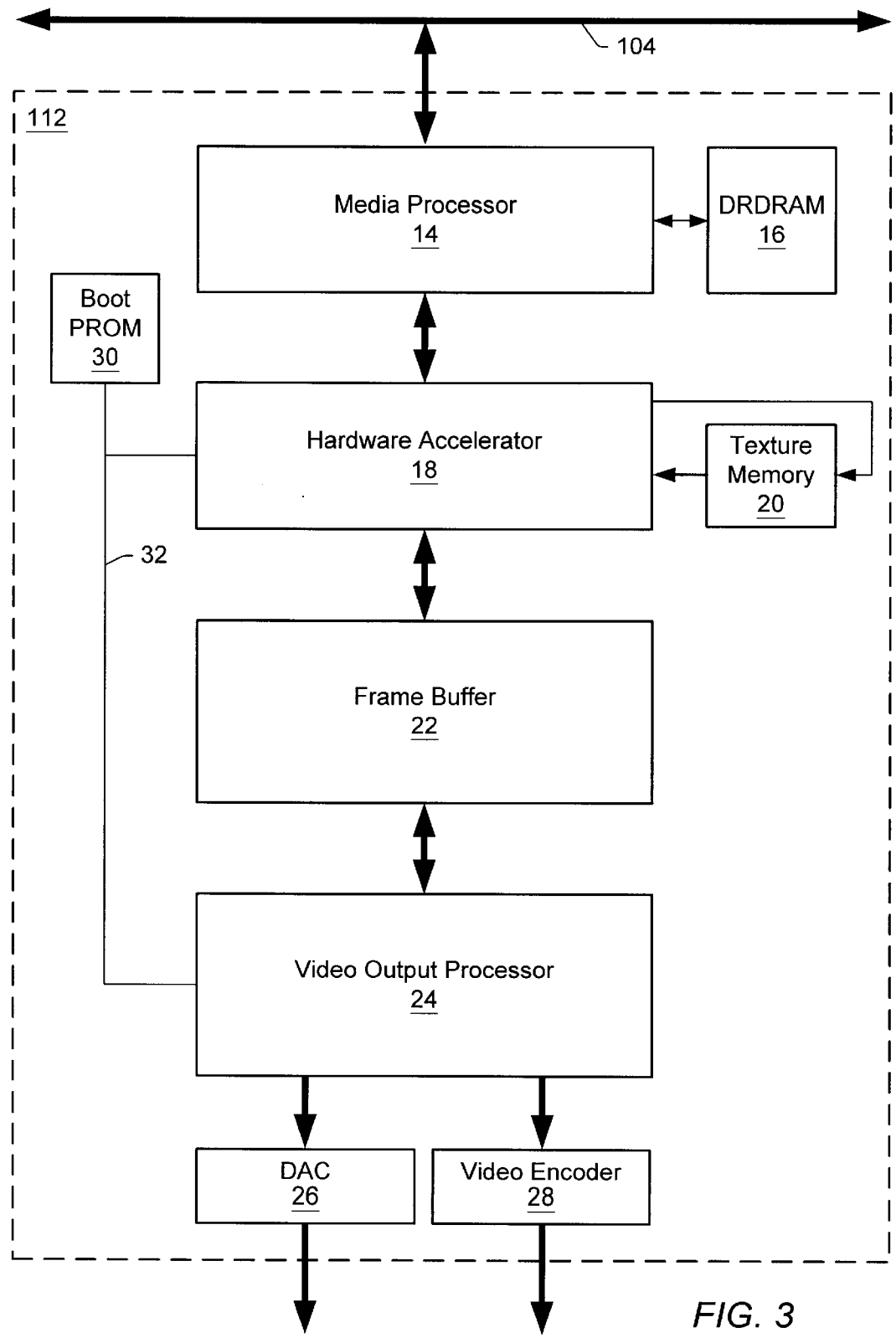
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
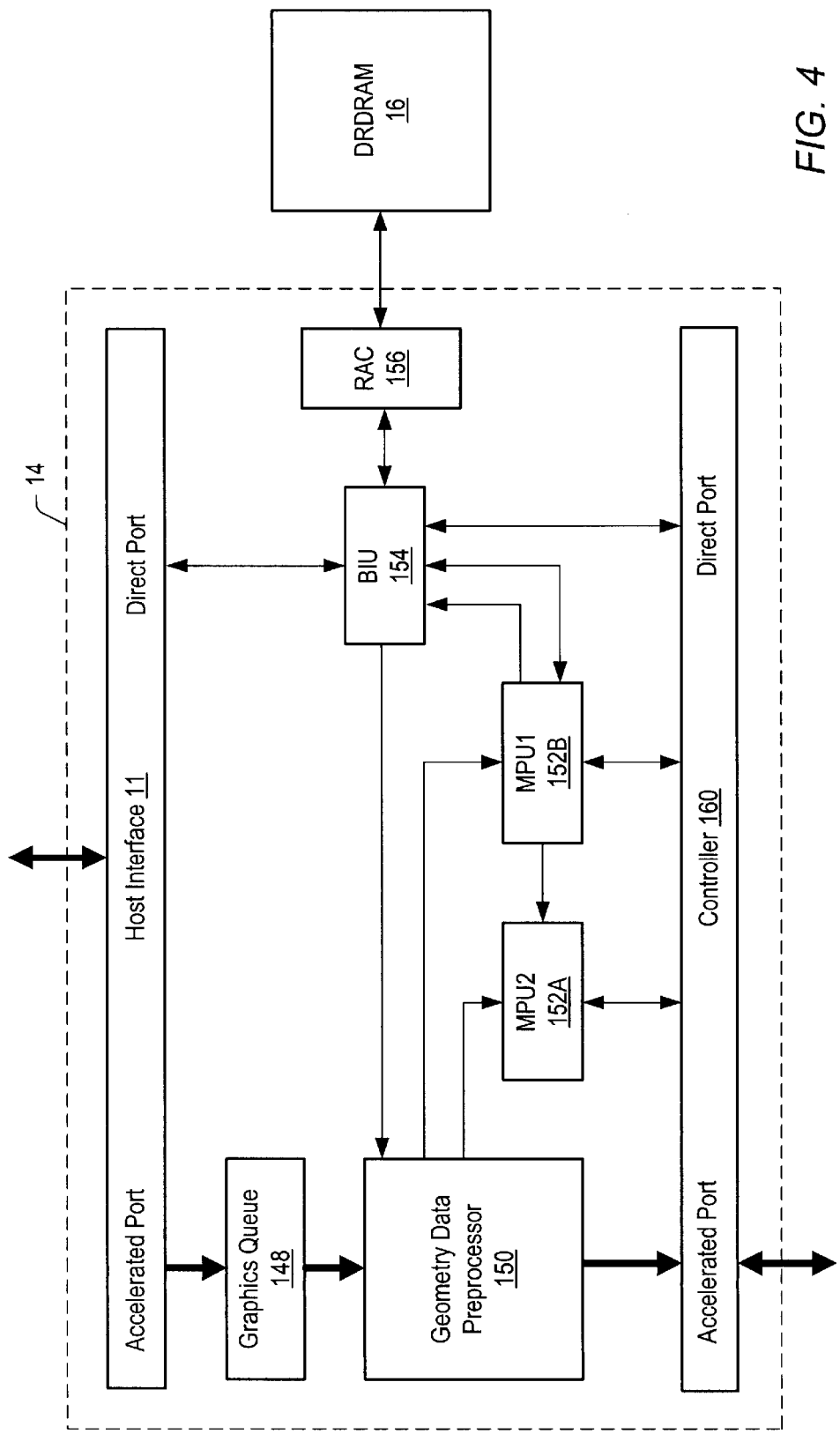
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
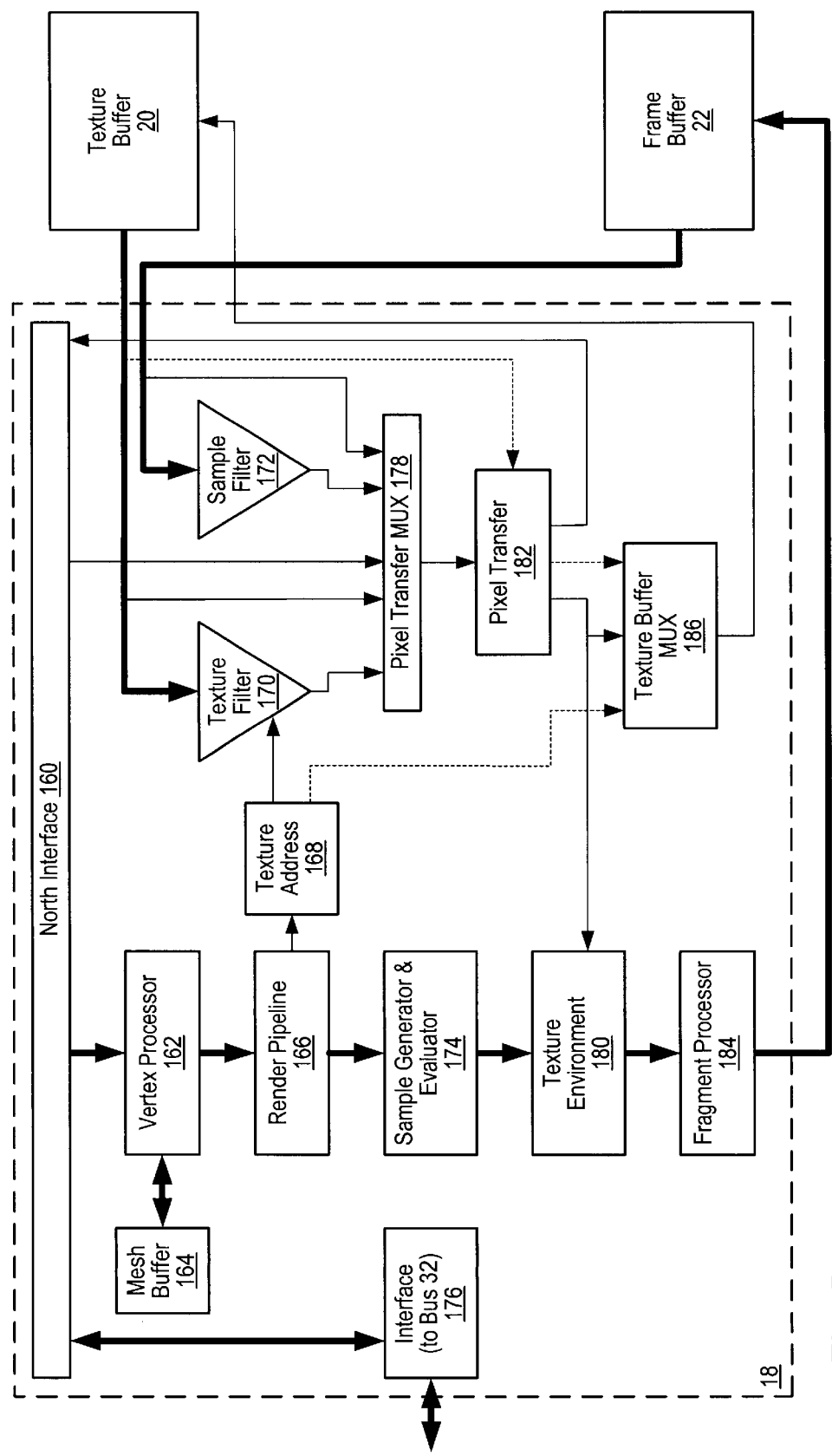
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions.

Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
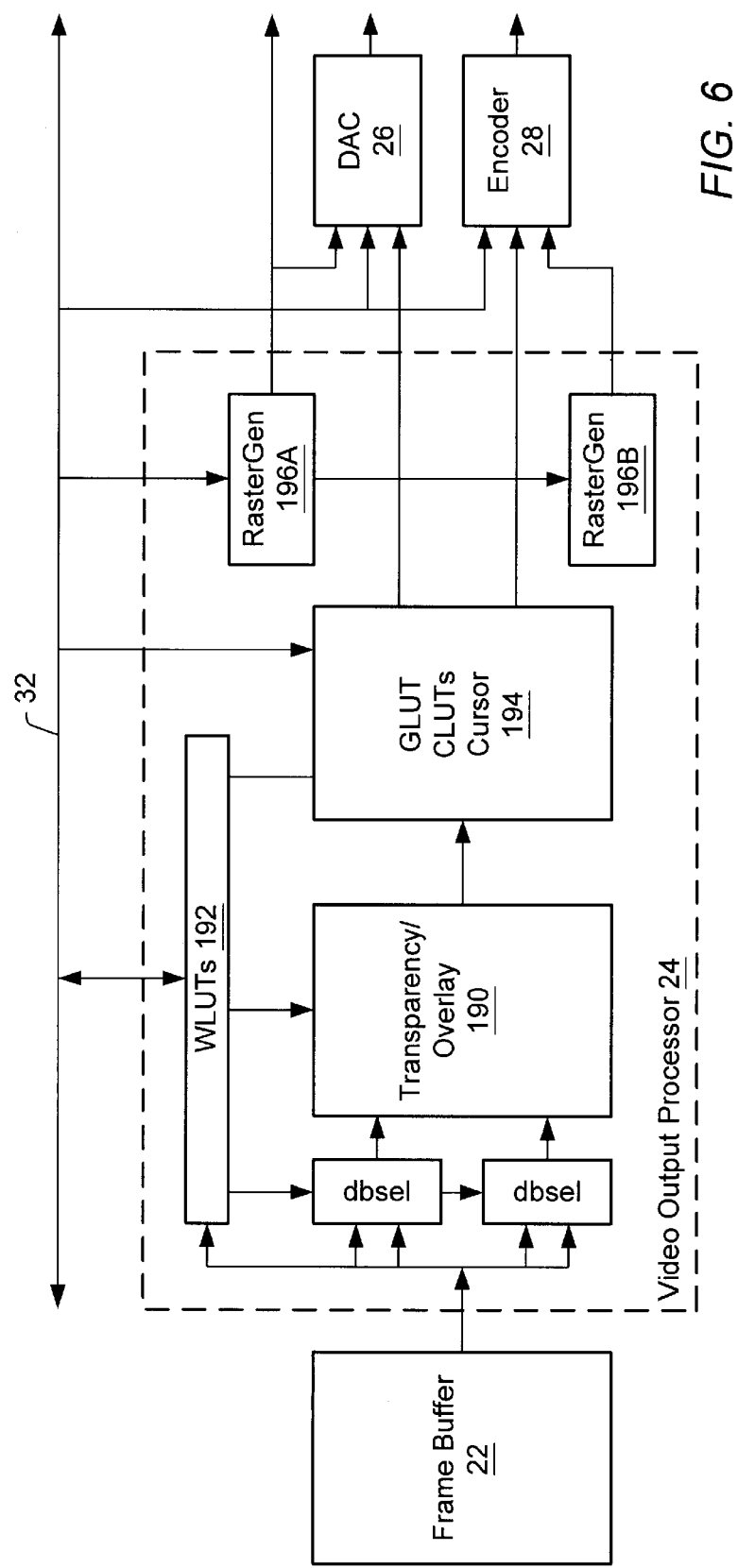
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
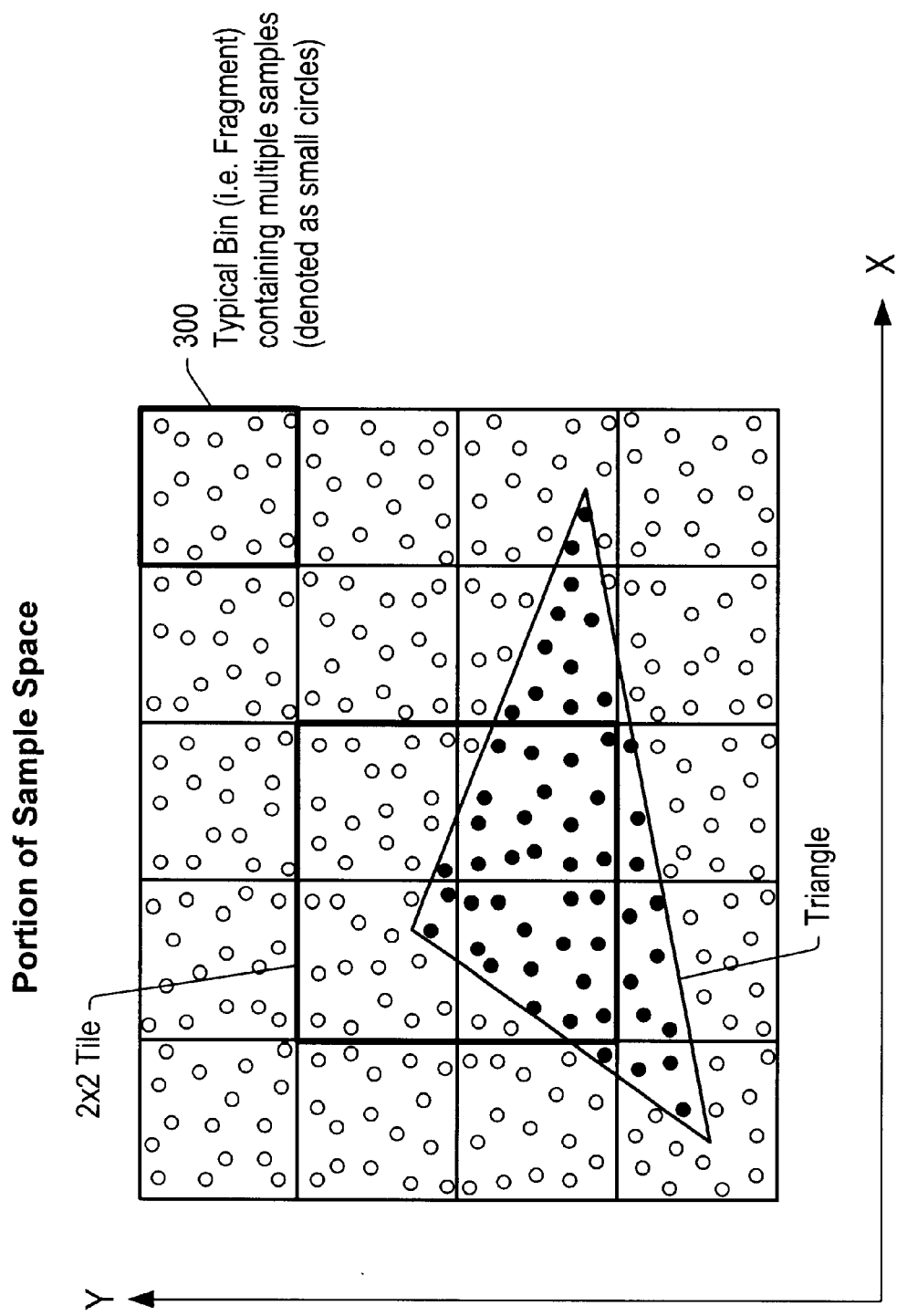
FIG. 7 is an illustration of a sample space partitioned into an array of bins.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins as illustrated in FIG. 7. Each bin may contain one or more samples. The number of samples per bin may be a programmable parameter.

Figure 8A:
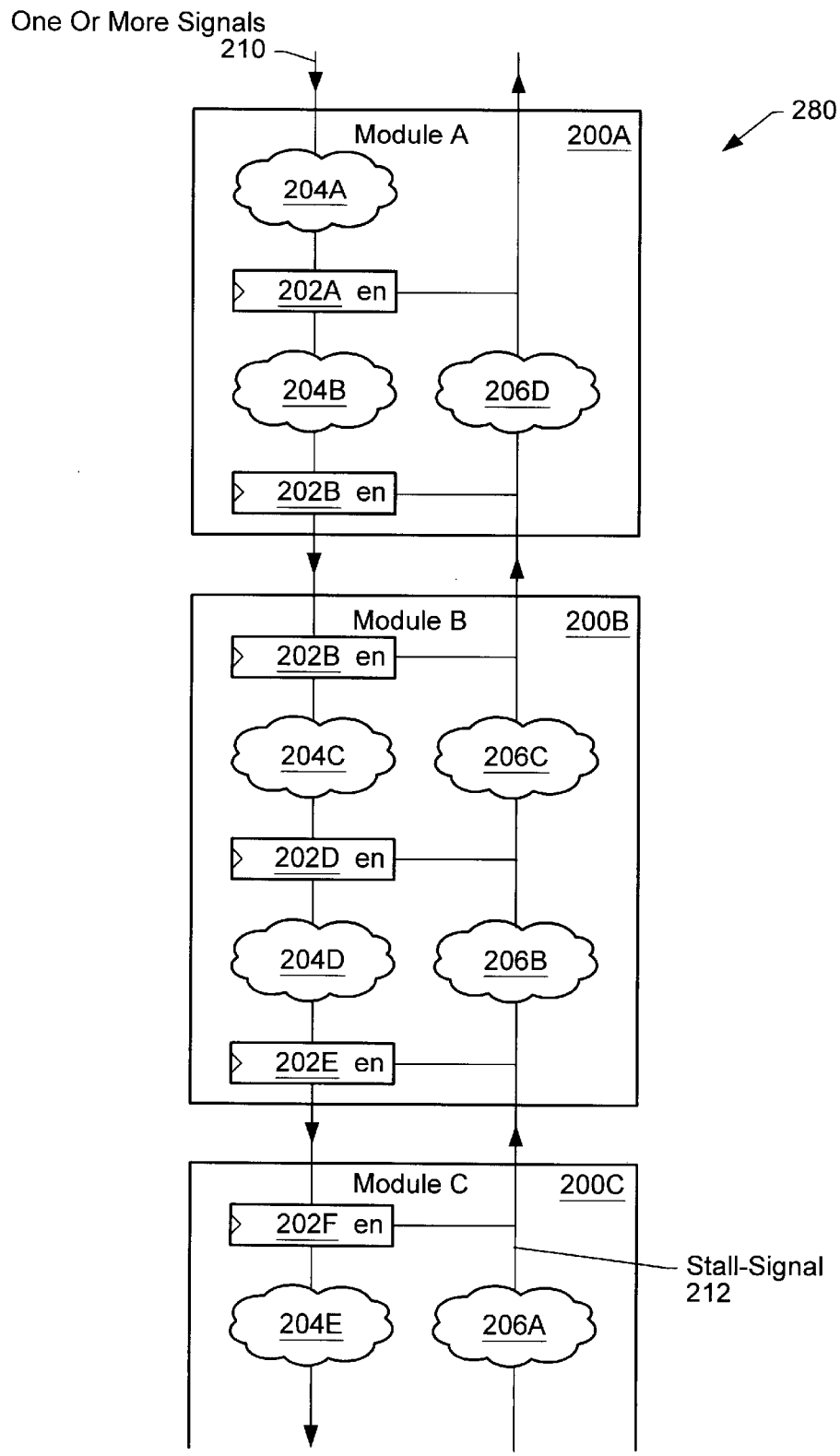
FIG. 8A is an illustration of prior art stalled pipeline design.

Stalled Pipeline Design (Prior Art)—FIG. 8A

FIG. 8A is an illustration of a prior art stalled pipeline design, according to one embodiment. A pipeline 280, also referred to herein as the computational pipeline 280, may comprise one or more modules, such as a first module 200A, a second module 200B, and a third module 200C. The one or more modules propagate one or more signals 210 down the signal path of the pipeline 280. Each of one or more modules 200A, 200B, and 200C may comprise internal logic 204A, 204B, 204C, 204D, 204E, and internal registers 202A, 202B, 202C, 202D, and 202E.

The computational pipeline 280 may comprise a stall-signal 212 operable to stall a module if a subsequent module is not ready to receive data. The stall-signal 212 is operable to travel in a direction opposite to the flow of the computational pipeline 280, i.e., a direction opposite to the flow of the one or more signals 210.

In a case where the computational pipeline 280 comprises a large quantity of logic elements, and/or a large quantity of modules and/or timing is sensitive, the design as shown may limit the capability of the stall-signal 212 to reach all of the required modules and/or logic elements at the proper time.

It is noted that the elements of the pipeline are exemplary only, other elements may be added as desired, and some elements may be left out as desired. In addition, each one of the internal registers may comprise multiple logic elements, as well as multiple inputs and outputs. Furthermore, there is only one signal line shown for the one or more signals 210 for simplicity.

Figure 8B:
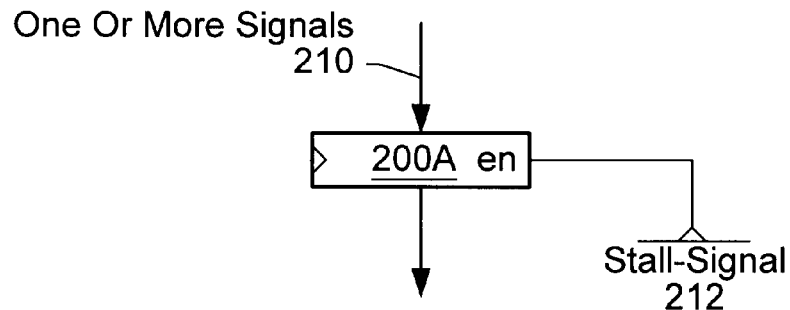
FIG. 8B is an illustration of a prior art internal register.

Internal Register (Prior Art)—FIG. 8B

FIG. 8B is an illustration of a prior art internal register, according to one embodiment. The stall-signal 212 may be operable to couple to the enable input of the internal register 200A. The internal register 200A may be operable to buffer the one or more signals 210 when the stall-signal 212 is asserted, and propagate the one or more signals 210 when the stall-signal 212 is de-asserted. Note that other embodiments of the internal registers may be used, as known in the art.

Figure 8C:
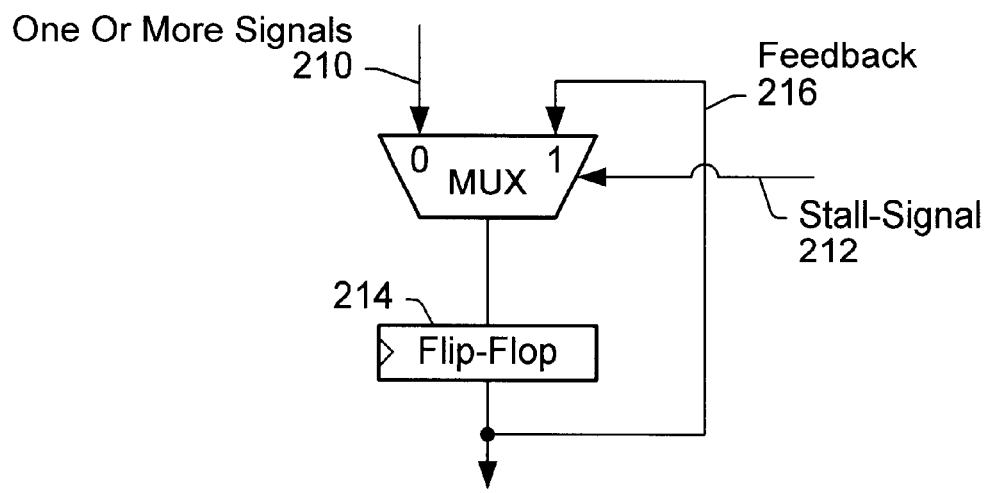
FIG. 8C is an exemplary block diagram of a prior art internal register.

Exemplary Block Diagram of an Internal Register (Prior Art)—FIG. 8C

FIG. 8C is an illustration of an exemplary block diagram of a prior art internal register, according to one embodiment. In this embodiment, a MUX, and a Flip-Flop 214 with a feedback loop may be used to model one part of the internal register 200A. Note that other embodiments of the internal elements may be used, as known in the art.

Figure 9A:
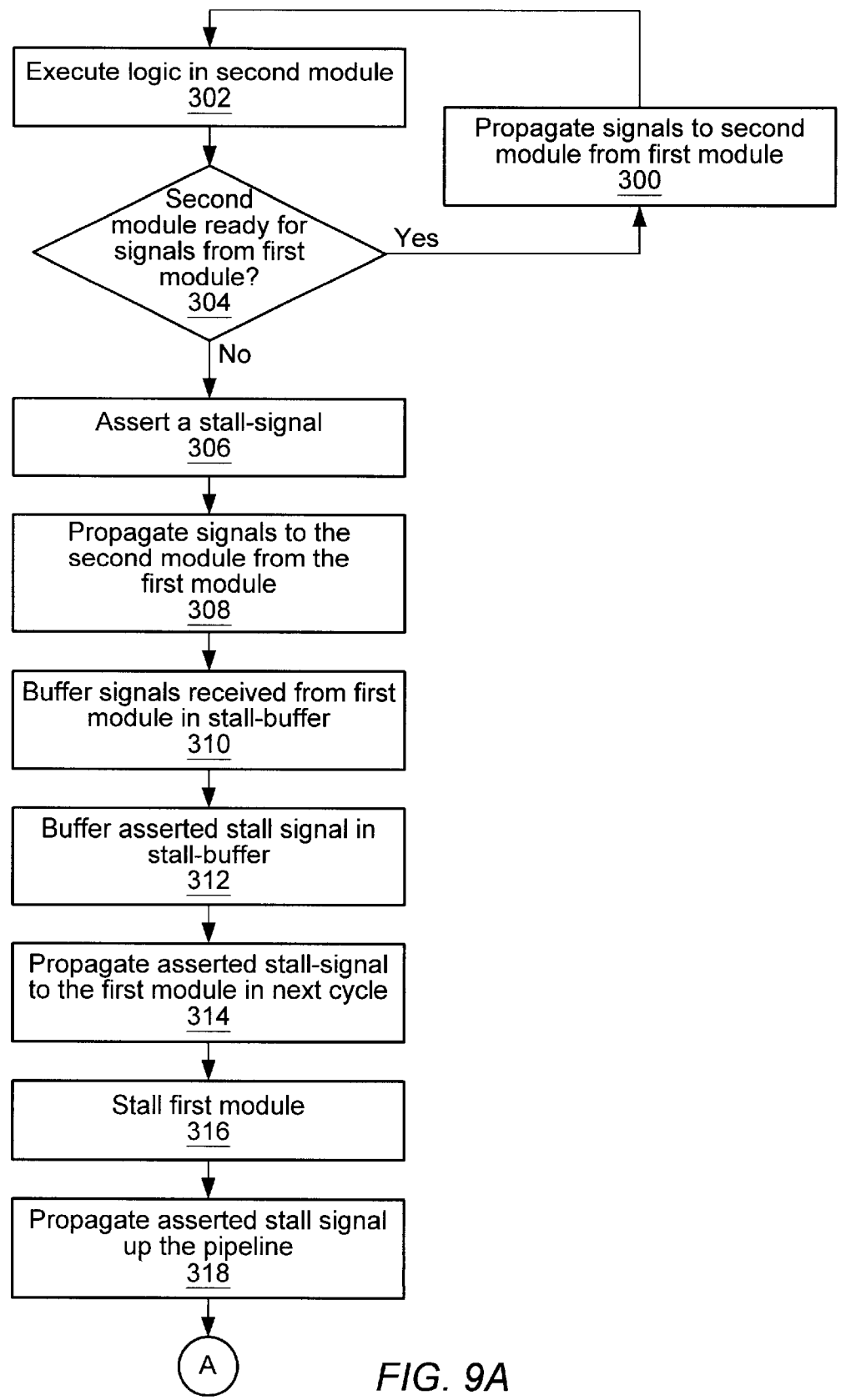
FIG. 9A is a flowchart illustrating one embodiment of a method for stalling large pipelined designs.

A Method for Stalling Large Pipelined Designs—FIG. 9A

FIG. 9A is a flowchart illustrating one embodiment of a method for stalling large pipelined designs. The following discussion refers to FIGS. 9A and 10A.

In one embodiment, the computational pipeline 280 may comprise a first module 200B and a second module 200C coupled together.

In step 300, the first module 200B may propagate the one or more signals 210 to the second module 200C.

In step 302, the second module 200C may execute some or all of the internal logic in response to receiving the propagated one or more signals 210 from the first module 200B.

In step 304, the method may include determining if the second module 200C is ready to receive the one or more signals 210 from the first module 200B. If the second module 200C is ready to receive the one or more signals 210 from the first module 200B, then the method may execute step 300 next.

In step 306 the method may include asserting the stall-signal 212 operable to stall the computational pipeline 280 if the second module 200C is not ready to receive the one or more signals 210 from the first module 200B. In one embodiment, the stall-signal 212 may be implemented using positive logic. Alternatively, the stall-signal 212 may be implemented using negative logic. In yet another embodiment, the stall-signal 212 may be implemented using mixed logic, a combination of the positive logic and of negative logic.

In step 308 the method may include propagating the one or more signals 210 from the first module 200B to the second module 200C.

In step 310, the method may include buffering the one or more signals 210 propagated from the first module 200B in a stall-buffer 220C in response to receiving the asserted stall-signal 212.

In step 312, the method may include buffering the asserted stall-signal 212 in the stall-buffer 220C in response to receiving the asserted stall-signal 212.

In step 314, the method may include propagating the asserted stall-signal 212 to the first module 200B in a next cycle after buffering the asserted stall-signal 212. In one embodiment, the next cycle may specify the next clock cycle. In another embodiment, the next cycle may specify a function of the next clock cycle.

In step 316, the method may include stalling the first module 200B in response to the first module 200B receiving the propagated asserted stall-signal 212. In one embodiment, stalling may be operable to suspend the operation of the first module 200B. In another embodiment, stalling may be operable to buffer the outputs of the first module 200B. In yet another embodiment, stalling may be operable to buffer the inputs of the first module 200B. In one embodiment, the first module comprises a first stall-buffer 220B.

In step 318, the method may include propagating the asserted stall-signal 212 up the computational pipeline 280. The asserted stall-signal 212 is operable to travel in a direction opposite to the flow of the computational pipeline 280, i.e., a direction opposite to the flow of the one or more signals 210.

It is noted that the flowchart of FIG. 9A is exemplary only. Further, various steps in the flowchart of FIG. 9A may occur concurrently or in different order than that shown, or may not be performed, as desired. Also, various additional steps may be performed as desired.

Figure 9B:
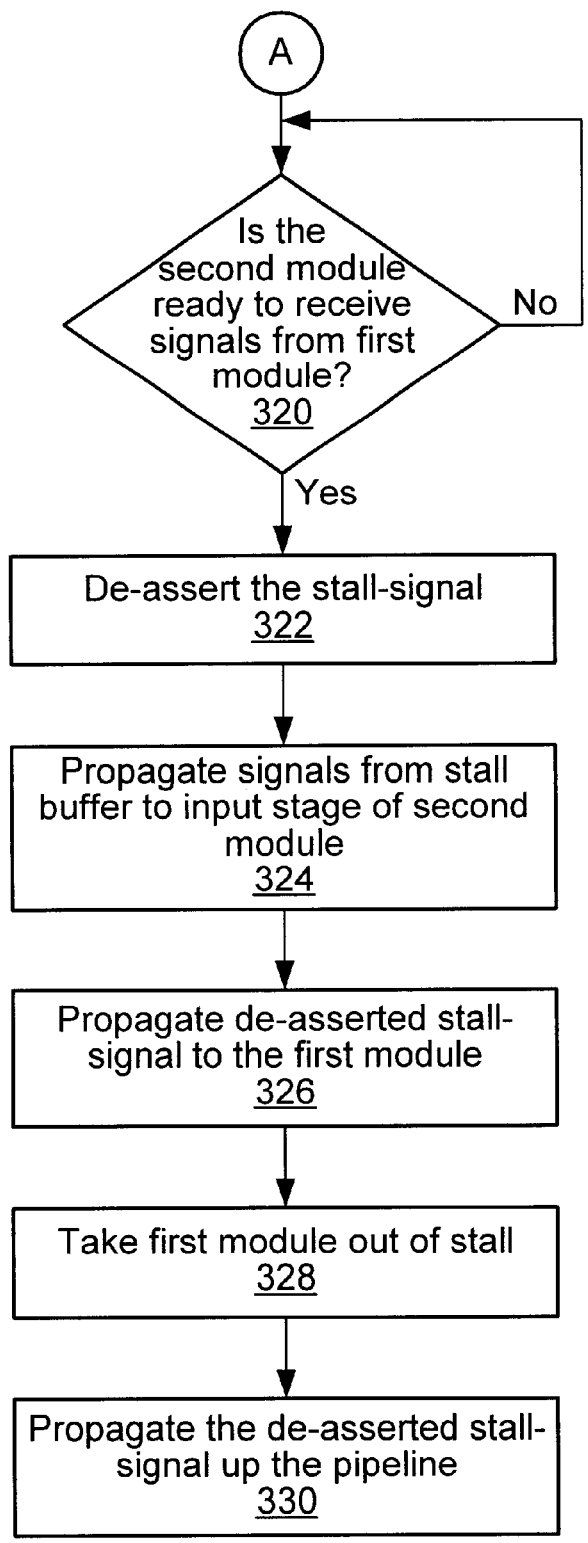
FIG. 9B is a flowchart illustrating one embodiment of a continuation of a method for stalling large pipelined designs.

Continuation of the Method for Stalling Large Pipelined Designs—FIG. 9B

FIG. 9B is a flowchart illustrating one embodiment of a continuation of the method for stalling large pipelined designs. The following discussion refers to FIGS. 9B and 10A.

In step 320, the method may include determining if the second module 200C is ready to receive the one or more signals 210 from the first module 200B. In one embodiment, if the second module 200C is not ready to receive the one or more signals 210 from the first module 200B, the stall-signal 212 may stay asserted.

In step 322, the stall-signal 212 may be de-asserted if the second module 200C is ready to receive the one or more signals 210 from the first module 200B.

In step 324, the method may include propagating the one or more signals 210 from the second stall-buffer 220C to an input stage of the second module 200C.

In step 326, the method may include propagating the de-asserted stall-signal 212 to the first module 200B. In one embodiment, the propagating may be performed in the next cycle. In one embodiment, the next cycle may specify the next clock cycle. In another embodiment, the next cycle may specify a function of the next clock cycle.

In step 328, the first module 200B may be taken out of stall mode in response to the first module 200B receiving the de-asserted stall-signal 212.

In step 330, the method may include propagating the de-asserted stall-signal 212 up the signal path of the computational pipeline 280. The stall-signal 212 is operable to travel in a direction opposite to the flow of the computational pipeline 280, i.e., a direction opposite to the flow of the one or more signals 210.

It is noted that the flowchart of FIG. 9B is exemplary only. Further, various steps in the flowchart of FIG. 9B may occur concurrently or in different order than that shown, or may not be performed, as desired. Also, various additional steps may be performed as desired.

Figure 10A:
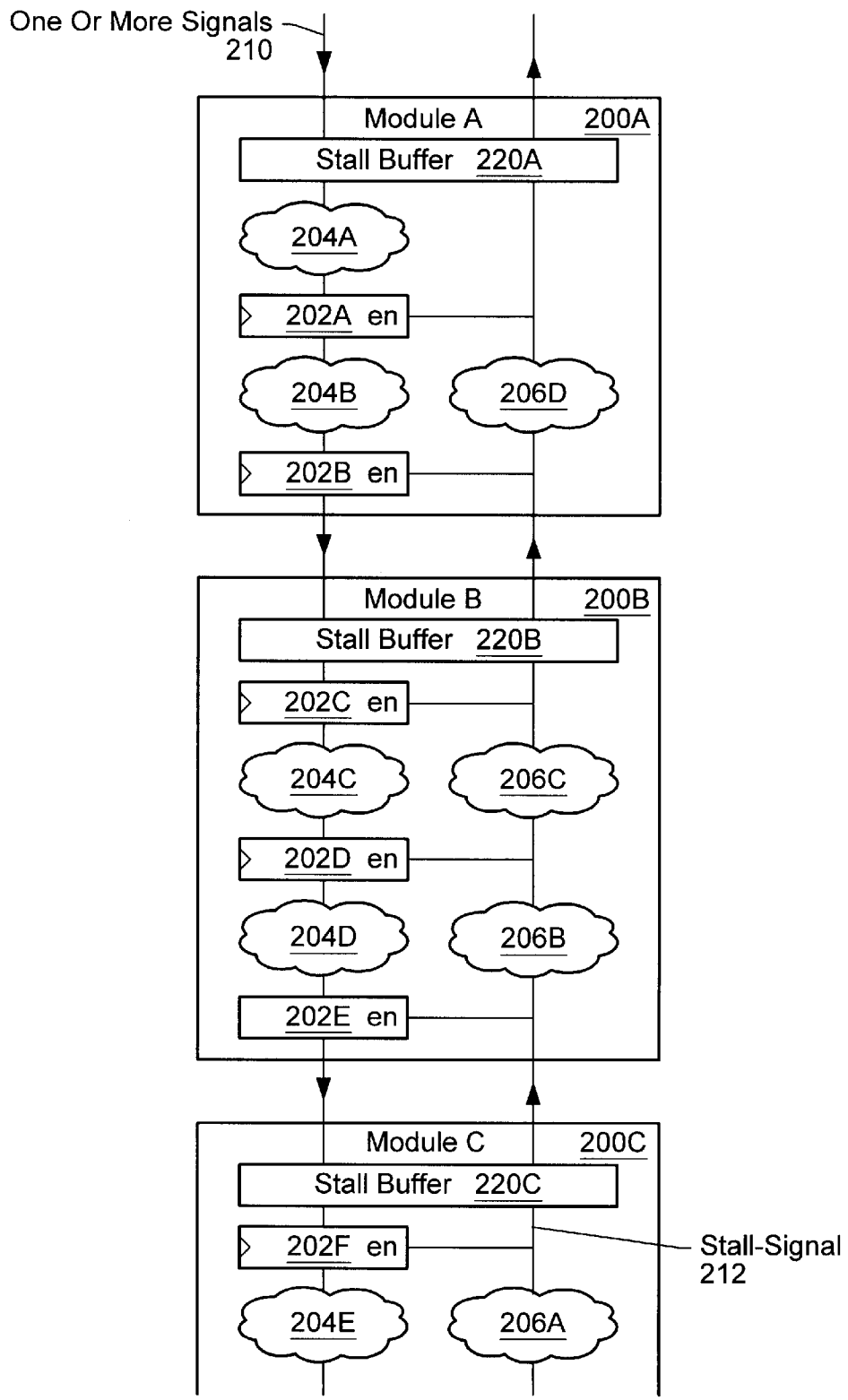
FIG. 10A is an illustration of a stalled pipeline design, according to one embodiment.

A Stalled Pipeline Design Using a Stall-Buffer—FIG. 10A

FIG. 10A is an illustration of one embodiment of a stalled pipeline design using a stall-buffer.

In one embodiment, a pipeline 280, also referred to herein as the computational pipeline 280, may comprise one or more modules, such as a first module 200A, a second module 200B, and a third module 200C. The one or more modules propagate one or more signals 210 down the signal path of the pipeline 280. Each of one or more modules 200A, 200B, and 200C may comprise internal logic 204A, 204B, 204C, 204D, 204E, and internal registers 202A, 202B, 202C, 202D, and 202E.

In one embodiment, each of the one or more modules 200A, 200B, and 200C may include a stall-buffer 220A, 220B, and 220C respectively. Module B is also referred to as the first module 200B. Module C is also referred to as the second module 200C. In one embodiment, the first module 200B and the second module 200C may be coupled together in order to propagate the one or more signals 210 from the first module 200B to the second module 200C.

In one embodiment, the stall-buffer 220C may be coupled to or comprised in the second module 200C, wherein the stall buffer 220C includes an input for receiving a stall-signal 212. In one embodiment, the stall-signal 212 may be generated when the second module 200C is not ready to receive the one or more signals 210 from the first module 200B. In one embodiment, the stall-buffer 220C is operable to buffer the one or more signals 210 from the first module 200B upon receiving the stall-signal 212, where the stall-signal 212 may comprise the asserted stall-signal 212. In one embodiment, the stall-buffer 220C is operable to stall modules 200A and 200B in the computational pipeline 280.

In one embodiment, the first module 200B is operable to receive the one or more signals 210 from the third module 200A. The stall-signal 212 is operable to propagate from the first module 200B to the third module 200A. In one embodiment, the third module 200A may further propagate the stall-signal 212 to previous modules (not shown) in the computational pipeline 280.

Furthermore, the computational pipeline 280 may comprise a stall-signal 212 operable to stall a module if a subsequent module is not ready to receive data. The stall-signal 212 is operable to travel in a direction opposite to the flow of the computational pipeline 280, i.e., a direction opposite to the flow of the one or more signals 210.

In one embodiment, the stall-signal 212 may comprise two states, asserted and de-asserted. In other embodiments, the stall-signal 212 may comprise a plurality of states.

It is noted that the elements of the pipeline are exemplary only, other elements may be added as desired, and some elements may be left out as desired. In addition, each one of the internal registers may comprise multiple logic elements, as well as multiple inputs and outputs. Furthermore, there is only one line shown for the one or more signals 210 for simplicity.

Figure 10B:
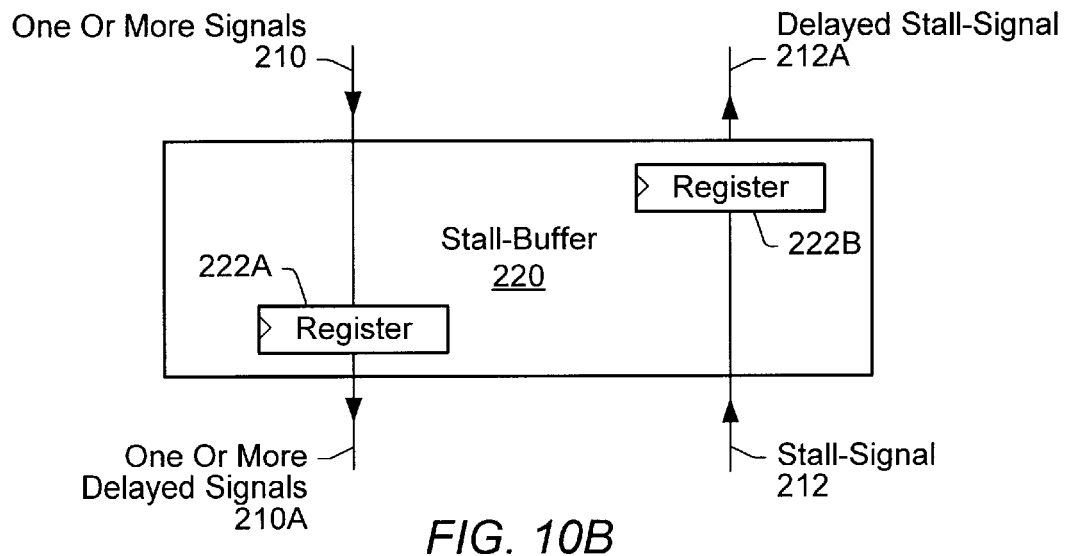
FIG. 10B is an illustration of a stall-buffer, according to one embodiment.

Stall-Buffer—FIG. 10B

FIG. 10B illustrates one embodiment of the stall-buffer 220. The register 222A may be operable to buffer the one or more signals 210 when the stall-signal 212 is asserted, and propagate the one or more signals 210 when the stall-signal 212 is de-asserted. In one embodiment, another register 222B may be operable to buffer the stall-signal 212. Note that other embodiments of the registers and/or stall-buffers may be used. In addition, FIG. 10B only shows one line for one or more signals 210, instead of multiple lines, for simplicity.

In one embodiment, the stall-buffer 220 may include an input operable to couple to an output of the first module 200B, where the output includes the one or more signals 210. The stall-buffer 220 may also include an output operable to couple to an input of the second module 200C, where the input includes the one or more signals 210.

In one embodiment, the one or more signals 210 may be delayed by the register 222A. As a result, the output of the register 222A may include the one or more delayed signals 210A. In another embodiment, the stall-signal 212 may be delayed by the register 222B. As a result, the output of the register 222B may include the delayed stall-signal 212A. In one embodiment, the stall buffer 220 comprises memory for buffering the one or more signals 210 and/or the stall-signal 212.

It is noted that the elements of the stall-buffer are exemplary only, other elements may be added as desired, and some elements may be left out as desired.

Figure 10C:
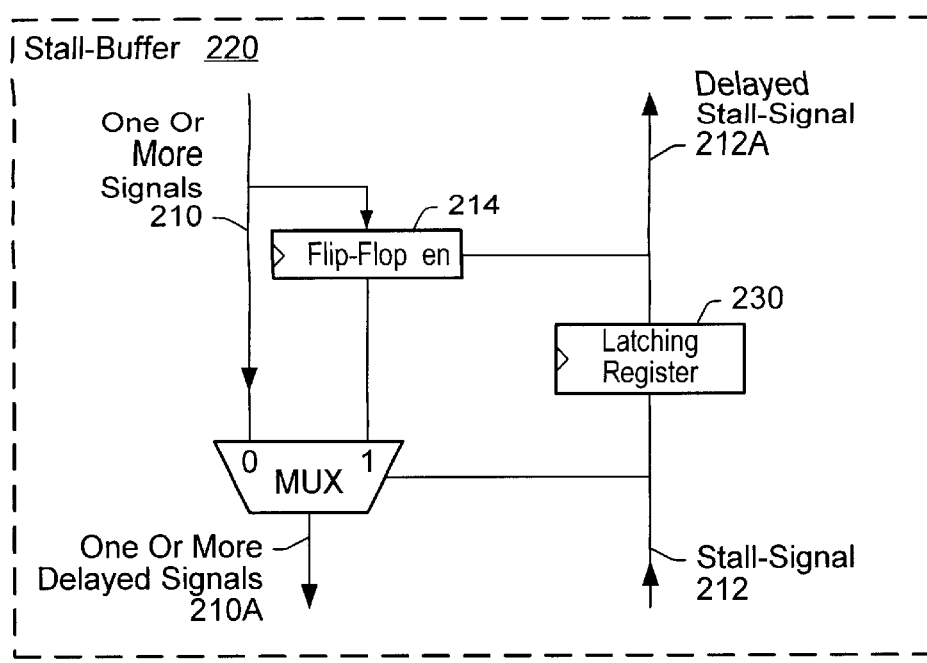
FIG. 10C is an illustration of a detailed stall-buffer, according to one embodiment.

Detailed Stall-Buffer—FIG. 10C

FIG. 10C illustrates one embodiment of the detailed stall-buffer. This exemplary embodiment of the stall-buffer 220 may include one or more Flip-Flops 214, one or more multiplexers (MUX), and one or more latching registers 230, besides others. Note that other embodiments of the registers and/or stall-buffers may be used. In addition, FIG. 10C only shows one line for one or more signals 210, instead of data lines, for simplicity.

In one embodiment, the one or more signals 210 may be delayed by the MUX. As a result, the output of the MUX may include the one or more delayed signals 210A. In another embodiment, the stall-signal 212 may be delayed by the latching register 230. As a result, the output of the latching register 230 may include the delayed stall-signal 212A.

It is noted that the elements of the stall-buffer are exemplary only, other elements may be added as desired, and some elements may be left out as desired.

Logic Synthesis

In one embodiment, when synthesizing a module, a design-compiler may normally place buffers on "stall" to meet design rule constraints and timing. This may cause a problem with the way that the design-compiler groups buffers and flip-flops, in such a way that timing is still not matched after the lay-out stage of the design.

In one embodiment, a design of the module may be synthesized a certain way in order to prevent synopsis from buffering stall and still meet timing requirements. The design may be started by creating a dummy driver cell with infinite drive strength, and place the dummy driver cell on the stall input. Next, special scripts may be synthesized in order to prevent buffer insertion. The design-rule checking on stall may also be disabled prior to synthesizing.

In one embodiment, during the placement/routing stage of the design, all of the blocks may be placed. Next, a place/route tool may be used to remove the dummy driver cell, and replace it with a clock-tree buffer type buffer tree. As a result, the correct buffer placement and grouping may be achieved based on the physical placement of the flip-flops.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A system, comprising:

a first module;

a second module coupled to the first module, wherein the first module and the second module are coupled together in order to propagate one or more signals from the first module to the second module; and a stall-buffer coupled to or comprised in the second module, wherein the stall buffer includes an input for receiving a stall-signal, wherein the stall-signal is generated when the second module is not ready to receive the one or more signals from the first module, wherein the stall-buffer is operable to buffer the one or more signals from the first module upon receiving the stall-signal;

wherein the stall-buffer is further operable to stall and buffer the stall-signal.

2. The system of claim 1, wherein the stall-buffer is also operable to stall the first module after receipt of the stall-signal.

3. The system of claim 2, wherein said stalling the first module comprises buffering the one or more signals from the first module in the stall-buffer prior to propagating the one or more signals to the second module.

4. The system of claim 1, wherein the first module and the second module are comprised in a computational pipeline;

wherein the stall-buffer is operable to stall modules in the computational pipeline.

5. The system of claim 1, the stall-buffer further comprising:

an input operable to couple to an output of the fist module;

an output operable to couple to an input of the second module.

6. The system of claim 1, wherein the stall-signal is operable to be stalled by the stall buffer coupled to the second module before being propagated to the first module.

7. The system of claim 1, further comprising a third module;

wherein the first module is operable to receive the one or more signals from the third module;

wherein the stall-signal is operable to propagate from the first module to the third module.

8. The system of claim 1, wherein the stall-signal is operable to propagate up a signal path of the computational pipeline.

9. The system of claim 1, wherein the stall-signal is further operable to take the first module out of stall if the second module is ready to receive the one or more signals from the first module.

10. A stall-buffer for stalling modules in a computational pipeline, wherein the computational pipeline comprises a first module and a second module, wherein the first module and the second module are coupled together in order to propagate one or more signals from the first module to the second module, the stall-buffer comprising:

an input operable to couple to an output of the first module;

an output operable to couple to an input of the second module;

a memory coupled to the input and the output for buffering signals;

a stall-signal input for receiving a stall-signal, wherein the stall-signal is generated when the second module is not ready to receive the one or more signals from the first module; and wherein the stall-buffer is operable to buffer the one or more signals from the first module upon receiving the stall-signal;

wherein the stall-buffer is further operable to stall and buffer the stall-signal.

11. A method for stalling modules in a computational pipeline, wherein the computational pipeline comprises a first module and a second module coupled together, comprising:

asserting a stall-signal operable to stall the computational pipeline if the second module is not ready to receive one or more signals from the first module;

propagating the one or more signals from the first module to the second module;

buffering the one or more signals propagated from the first module in a stall-buffer in response to receiving the asserted stall-signal;

buffering the stall-signal in the stall-buffer in response to receiving the asserted stall-signal;

propagating the stall-signal to the first module in a next cycle after said buffering the stall-signal; and stalling the first module in response to the first module receiving the propagated stall-signal.

12. The method of claim 11, wherein the stall-buffer is associated with the second module; and wherein the system further includes a first stall-buffer associated with the first module.

13. The method of claim 12, wherein the stall-buffer comprises:

an input operable to couple to an output of the first module;

an output operable to couple to an input of the second module.

14. The method of claim 11, further comprising:

propagating the asserted stall-signal up a signal path of the computational pipeline.

15. The method of claim 14, wherein each subsequent module up the signal path of the computational pipeline is operable to be stalled in response to receiving the asserted stall-signal.

16. The method of claim 14, wherein the first module and the second module each comprise an input stage and an output stage.

17. The method of claim 16, further comprising:

de-asserting the stall-signal if the second module is ready to receive the one or more signals from the first module.

18. The method of claim 17, further comprising:

propagating the one or more signals from the stall-buffer to the input stage of the second module in response to said de-asserted stall-signal.

19. The method of claim 18, further comprising:

propagating the de-asserted stall-signal to the first module.

20. The method of claim 19, further comprising:

taking the first module out of stall in response to receiving the de-asserted stall-signal.

21. The method of claim 17, further comprising:

propagating the de-asserted stall-signal up a signal path of the computational pipeline.

22. The method of claim 21, wherein each subsequent module up the signal path of the computational pipeline is operable to be taken out of stall in response to receiving the de-asserted stall-signal.

23. The method of claim 11,
wherein the stall-signal is operable to be stalled by the stall buffer coupled to the second module before being propagated to the first module.

24. A method for stalling modules in a computational pipeline, wherein the computational pipeline comprises a first module and a second module coupled together, comprising:

asserting a stall-signal operable to stall the computational pipeline if the second module is not ready to receive one or more signals from a first module, wherein the first module and the second module comprise a first stall-buffer and a second stall-buffer respectively;

propagating the one or more signals from the first module to the second module;

buffering the one or more signals propagated from the first module using a second stall-buffer in response to receiving the asserted stall-signal;

buffering the stall-signal in the second stall-buffer in response to receiving the asserted stall-signal;

propagating the stall-signal to the first module in a next cycle;

stalling the first module in response to the first module receiving the propagated stall-signal.

* * * * *